Patented Dec. 26, 1950

2,535,604

UNITED STATES PATENT OFFICE 2,535,604

PROCESS OF PREPARING WAX COMPOSITIONS

Knapel F. Schiermeier, Alton, and Walter E. Heinz, Roxana, Ill., assignors to Shell Development Company, San Francisco, Calif., a corporation of Delaware No Drawing. Application September 6, 1947, Serial No. 772,596

17 Claims. (Cl. 196—17)

1

This invention relates to improved wax compositions which are adaptable for use as protective coatings on solid objects, and to the preparation of such wax compositions. More particularly, this invention pertains to a process of preparing hydrocarbon wax-containing compositions which are especially suitable for forming corrosion-preventive coatings on ferruginous materials, particularly steel.

It is known to provide corrodible metal objects with coatings of waxy materials, including petroleum waxes, by any one of three general methods. The wax may be applied to the surface of the object either as a solution in a suitable volatile solvent; from a molten body of the wax; or as a dispersion of the wax in a suitable carrier such as water or an organic medium, wherein the wax is maintained in suspension in the medium by means of a suitable dispersing agent. The formation of a coating of a hydrocarbon wax by any one of these known methods is unsatisfactory for one reason or another, chief among which is usually the obtaining of a grainy or porous coating. The latter, because of its relatively open structure, does not sufficiently seal off or protectively coat an object, particularly in the case of steel. A grainy and porous coating, even in the case of an added rust-preventive agent, allows the steel to undergo a detrimental and serious amount of rusting. An unsatisfactory property of prior dispersions or suspensions of wax, both fluid and paste-like, has been their instability and the settling out of the wax particles or their lumping together in a non-homogeneous manner, thus also producing coatings of a grainy, non-uniform and open porous structure.

It is an object of this invention to overcome the above-described and other defects of the prior art. Another object is to provide a method of preparing hydrocarbon wax compositions which latter, when so-produced, are particularly suited for coating metals with a continuous non-porous seal. A further object is to provide improved corrosion-preventive wax coating compositions. Still another object is to provide a process of preparing improved protective sealcoating compositions. Other objects will be apparent from the following description of this invention.

The present invention pertains to an improved wax composition comprising a dispersion of a wax in an inert liquid diluent, which composition when prepared by the process of this invention (as hereinafter described) has the peculiar

2 property of producing a continuous non-porous seal coating on solid objects, thus overcoming various defects of the prior art.

Described broadly, the present invention is based on the discovery that a semi-liquid storage-stable suspension of a wax in an inert liquid diluent may be produced by holding a predominantly waxy material at a sufficiently high temperature under vigorous agitation to convert said material to a free-flowing semi-liquid material composed of a liquid phase containing a substantial proportion of liquefied normally solid wax and finely dispersed therein a substantial proportion of solid wax particles, vigorously agitating this resultant semi-liquid material while cooling it sufficiently to solidify a substantial proportion of the liquefied wax into finely dispersed solid wax particles and, at the same time, maintaining the mass in a semi-liquid state, and blending an inert liquid diluent with the last resulting semi-liquid mass under vigorous agitation. The term "semi-liquid" as used herein and in the appended claims refers to a fluid mass comprising a continuous liquid phase containing solid particles dispersed therein.

The temperature of the specified cooling step (i. e. the second step), and at which blending may also be initiated and partially effected, may be above the A. S. T. M. melting point of the original wax material so long as the requirement is met of having a substantial proportion of solid wax present in a finely dispersed state from the vigorous agitation conducted at that temperature.

Thus, the process for producing the present products comprises heating a predominantly wax material (which may or may not contain occluded and/or dissolved oils normally associated therewith) to a sufficiently high temperature under vigorous agitation to convert said material to a free-flowing semi-liquid material containing some liquefied wax and finely dispersed solid wax particles, vigorously agitating the resultant semi-liquid material while cooling it to solidify a substantial proportion of the liquefied wax into finely dispersed solid wax particles, and blending therewith at the latter cooled temperature under vigorous agitation an inert liquid organic diluent.

The temperature of the blending operation, like that of the first cooling operation, and both of which are in the same temperature range, is sufficient to maintain or to bring about a semi-liquid state in which substantially all of the solid wax present exists as a fine stable dispersion.

Upon allowing the blend thus-produced to cool to room temperature, substantially all of the solidified wax is retained as a finely dispersed storage-stable suspension.

The products or suspensions of wax in an inert organic diluent produced by the above-described process of this invention are remarkably improved and even unique by virtue of their capability of depositing a continuous, smooth, substantially non-porous seal coat upon a solid object, particularly upon a metal.

The term "predominantly wax material" as used herein refers to a hydrocarbon or oxyhydrocarbon waxy substance such as a normally occurring mixture of waxes of different molecular species having individually materially different melting points and which may and preferably does contain minor amounts of the oils normally associated therewith. The wax material, that is the mixture of differently melting waxes, may consist wholly of waxes substantially free of oil so long as there is a sufficient spread of melting-points between the different wax components of the wax material to allow the specified semi-liquid formation.

An oil-free wax may be used as starting material in the practice of the invention and the desired semi-liquid formation may be obtained by blending in a minor amount of oil sufficient to give an A. S. T. M. melting point of the wax-oil blend of preferably at least about 110° F.

Although any wax fraction may be employed in accordance with the present invention, hydrocarbon wax fractions as obtained industrially from petroleum are particular effective. These petroleum wax fractions are selected according to their melting points and their other physical properties as desired. In most cases, it is preferred to employ residual petrolatum waxes or petrolatums having an A. S. T. M. melting point within the range of from about 110° F. to about 180° F. The short residue petrolatums, and particularly those melting at a point between 130° F. and 160° F., are of particular utility in preparing the products of the invention. The A. S. T. M. melting point herein referred to is that determined by the method of the American Society of Testing Materials (A. S. T. M.) D 127-30.

The first step of the process, which comprises heating the predominantly wax material, converting it to a semi-liquid material, and vigorously agitating it, is usually carried out at a temperature at least about 20° F. and preferably about 30° F. below the temperature of formation of a single liquid phase for the material. This is particularly true for petrolatum waxes. The mixture of molecular species of hydrocarbon waxes making up a conventional petrolatum wax is such that at the above-specified temperatures a substantial proportion of the individual wax components making up the wax will not have melted and will remain as solid particles in a dispersed form. The above-specified temperatures relative to single liquid phase formation are, in general, not more than from about 20° F. to about 30° F. above the A. S. T. M. melting point of the wax material.

In the second step of the process, the agitation is continued while allowing the resultant semi-liquid material to cool to a lower temperature as specified above, and which is preferably at least slightly below and preferably not more than about 40° F. below said A. S. T. M. melting point, said lower temperature being sufficient to at least partially solidify the liquefied wax, while maintaining the entire mass in a semi-liquid state, but the mass being modified in having a substantially increased number of finely dispersed solid wax particles. The proportion of the liquefied wax which may be solidified in this step, while maintaining the entire mass in a semi-liquid state, will depend on the proportion of oil or other liquid which is present. In the third step, the product of the second step is blended, within the lower temperature limits of said second step, and with mechanical agitation, with an inert liquid organic diluent. The latter diluent, as employed, is sufficient to allow the solidified wax portion to remain as a finely dispersed storage-stable suspension.

Although one can convert a predominantly wax material to a semi-liquid by holding the material at its A. S. T. M. melting point for a sufficient length of time therefor, and can vigorously agitate the resultant semi-liquid at this temperature in accordance with this invention, it is preferable in order to attain greater speed in the semi-liquefying action in the first step as well as relatively more liquefied wax, to heat the wax material to a temperature at least slightly above, e. g. 5° F. or more, and particularly between about 10° F. and about 30° F. above the A. S. T. M. melting point of the wax material. The optimum temperature in most cases is about 10° to about 15° F. above the A. S. T. M. melting point.

The cooling operation (second step) of the invention can be carried out at slightly below, as e. g. one degree Fahrenheit or so below the A. S. T. M. melting point. However, it is preferable to cool the semi-liquid to at least 5° F. and up to about 40° F. below said melting point. For most cases the optimum temperature to which the semi-liquid is cooled and at which the subsequent blending in of an inert liquid diluent is carried on, is about 20° F. to 30° F. below the A. S. T. M. melting point of the initial predominantly hydrocarbon wax material.

The temperature of blending with an inert liquid diluent should initially be that of the lower temperature effected in the cooling operation. However, all of the blending can be effected at this lower temperature, or as the blending is continued, the resulting blend can be allowed to cool further than that due to the progressive addition of the cold diluent providing that after complete addition of the diluent the whole blend is heated to a temperature sufficient to insure the existence of substantially all of the solidified wax in a finely dispersed storage-stable suspension. Therefore, the final temperature of blending must meet the latter requirement. This final temperature of blending is generally within the range of temperature of the cooling operation in the second step, and in most cases is preferably not more than about 40° F. below the A. S. T. M. melting point of the original predominantly hydrocarbon wax material.

The diluents employed for blending are preferably organic liquids of relatively low overall polarity, and particularly liquid hydrocarbon diluents. The latter may be mineral spirits, kerosene, ligroin, benzine, naphtha, aromatic petroleum extracts, benzene, toluene, xylenes, light gas oils, light lubricating oils, heavy lubricating oils, etc. Although an organic liquid diluent of relatively low polarity is preferred, any organic liquid diluent may be used which is compatible with the wax for the purpose and substantially inert toward the wax, such as liquid alcohols, esters, ketones, aldehydes, ethers, polyalkylene ethers or oxides, and synthetic oxyhydrocarbons. Particularly advantageous as diluents for the blending are: mineral spirits petroleum distillates having a boiling point within the range of between about 300° F. and about 400° F., or any fraction thereof; also predominantly aromatic petroleum extracts, e. g. those containing 55-60% of xylenes, ethyl benzenes, etc., boiling between about 300° F. and about 390° F.; also the various grades of petroleum lubricating oils which have been refined by conventional methods.

In the use of diluents, more than one may be employed in stepwise fashion during a sequence in the blending, or a compatible mixture of various diluents may be used. In an embodiment of this invention, it is often advantageous first to blend in a relatively viscous petroleum lubricating oil with a mixture of hydrocarbon waxes such as conventionally obtained from petroleum and at a relatively high blending temperature, e. g. a few degrees (as about 5° F.) above the A. S. T. M. melting point of said mixture; this operation is followed by adding a relatively highly fluid diluent such as mineral spirits and at a somewhat lower temperature during the blending operation.

The matter of choice of particular diluents for blending into the present products is a matter of whether a relatively fluid blend is desired which can be applied to surfaces of metal at room temperature by brushing, spraying or dipping to provide a soft thin film; or whether a thick viscous blend as a grease or having approximately the consistency of petrolatum is desired. The latter blend may be termed an improved petrolatum type of coating material, and is successfully applied by a hot dip.

The relative amounts of the one or more various specified diluents with respect to the amount of wax in the present products are adjusted according to the fluidity or consistency requirements as above described. This will be readily understood by those skilled in the art; it is also readily ascertained by simple aliquot or small-scale empirical adjustments or tests. The amount of wax in a blend employed for a particular protective coating operation need only be sufficient to allow a continuous smooth non-porous film of wax (which may contain non-volatile oil) to form on the surface of an inert solid object covered with a thin layer of the blend. This is the minimum requirement for wax content but more wax may be present up to any practical amount so long as it is stably dispersed in finely divided particles according to the process of the invention.

When the above operations and blending procedure of the instant invention are followed, the waxes in suspension at room temperature are so dispersed in the blend that the suspension does not settle even after storage for several months and even longer.

The present wax-solvent dispersions or products, as brought out above, in themselves yield effective rust-preventive coatings upon steel. These products may additionally be improved by incorporation of any wax-oil-compatible surface-active additive conventionally known. Such additives which have known rust-preventive properties are well known and are especially valuable. Among these rust-preventive additives there may be mentioned glyceryl mono-oleate, oil-soluble dicarboxylic and polycarboxylic acids having at least about twelve and preferably sixteen carbon atoms and the oil-soluble non-corrosive derivatives of these acids, organic sulfonate salts such as aromatic petroleum sulfonates, metallic naphthenates, organo phosphites, organo phosphates, also wax-compatible oil-soluble organic nitrites. The amount of additive that may be employed in a blend may vary over wide limits, and generally is not critical. Usually between about 1% and about 25 wt. per cent of the additive may be employed, a preferred range of concentration being between about 5% and about 15 wt. per cent of the final blend. The particular amount of a given additive depends upon the severity of conditions under which a coating is employed, and the maximum amount is limited only by compatibility and solubility with the wax-oil blend.

In another embodiment of this invention, the wax-oil blends described herein may be modified by blending in an asphalt, a similar bitumen, or resin compatible with the blend as a whole. Such materials, particularly the asphalts, are incorporated to obtain a more abrasion-resistant coating or film from the present blends, and to raise their softening point even still further than is achieved by the primary process of the invention. Preferred are oxidized asphalts having a melting point of at least about 170° F. and a penetration of at least about 30 at 77° F.

In general, to prepare the asphalt-containing blends, the primary wax-oil diluent blend is made separately in a manner as specified above, and a blend of asphalt with a suitable liquid organic diluent or solvent is prepared at a temperature sufficiently high above the asphalt melting point to effect homogeneity and a suitable fluidity for effecting later blending with the primary wax-oil blend. After these preparations the pre-prepared asphalt-diluent blend is thoroughly incorporated under vigorous agitation into the primary wax-oil diluent blend at approximately the final blending temperature employed in the cases of the wax-oil diluent primary blends alone.

The following examples are illustrative of the process of the invention and of the products prepared thereby.

EXAMPLE I

Twenty parts by weight of a residual petrolatum wax having an average A. S. T. M. melting point of about 140° F. and a penetration of between about 60 and 90 was heated to a temperature of about 170° F. under vigorous agitation. The petrolatum wax melt was vigorously agitated while allowing it to cool to about 135° F. At this temperature, addition of twenty-three parts by weight of mineral spirits solvent was started. The addition was made slowly, with the rate being gradually increased as more solvent was blended. Half of the total amount of the solvent used in the final blend was added. Normally, the blend cooled to below 120° F. because of the addition. The blend was reheated to about 120° F. The agitation was continued throughout.

Thirty-four parts by weight of an oxidized asphalt having a melting point between approximately 170° and 175° F. and a penetration of about 30 at 77° F. was melted and agitated at about 320° F. until uniform. One part by weight of a dispersing agent such as a surface active nitrogen derivative of a fatty acid was then added to the melted asphalt, mixed well at about 320° F. and the thorough agitation continued while the blend was allowed to cool. At about 300° F. mineral spirits solvent was slowly added to the blend, with the rate of addition being gradually increased as more solvent was blended. The addition was continued until half of the total amount (twenty-three parts by weight) of solvent used in the final blend was added. The blend was allowed to cool to about 130° F. The agitation was continued throughout.

The above petrolatum wax-mineral spirits blend and the above asphalt-mineral spirits blend were then thoroughly mixed with vigorous agitation at about 120° to 130° F. With continued agitation, this final blend was allowed to cool to about 75° F. (room temperature).

The thus-produced wax-asphalt blend in mineral spirits had an approximate viscosity, at 77° F. of 150 seconds Saybolt Furol. This blend, designated Blend A, was tested under the standard conditions of the AXS-673 corrosion prevention test on steel panels in comparison with an industrially marketed corrosion-preventive composition employed for the same purpose, and designated Blend S. Results are summarized in the table below:

| Tests (A–S–673) | Blend A | Blend S |
|---|---|---|
| Salt Spray, 10 days | No rusting | Some rusting. |
| Flexibility at −20° F. on polished steel panel. | None to slight cracking. | Bad cracking. |

EXAMPLE II

Four blends of petrolatum wax with a carrier were prepared in accordance with the hereinbefore described method of the present invention. The compositions of these blends, designated Blends B, C, D and E, respectively, are shown in the following table:

| | Composition [1] | | | |
|---|---|---|---|---|
| | Blend B | Blend C | Blend D | Blend E |
| Residual Petrolatum Wax [2] | 48 | 24 | 50 | 87 |
| Low Viscosity Index Neutral Lubricating Oil | 46 | 23 | 49 | 10 |
| Mineral Spirits | | 50 | | |
| Glyceryl Mono-oleate | 6 | 3 | 1 | 3 |

[1] All parts are by weight.
[2] A short residue petrolatum wax having a penetration of between about 60 and 90 and a melting point of about 150° F. (A. S. T. M. D-127-30 method).

The procedures used for preparing the above blends were as follows:

Blend B was prepared by melting the wax, heating it to approximately 170° F. but not higher, with vigorous mechanical agitation, allowing it to cool to about 155° F., then blending it gradually with the oil containing the mono-oleate. Vigorous mechanical agitation was maintained throughout; the final blending with agitation was carried out at a temperature not above about 145° F.

Blend C was prepared by melting the prepared Blend B and agitating it vigorously at approximately 150° F., allowing it to cool to approximately 135° F. and then, beginning at this temperature, blending in the mineral spirits, and allowing the temperature to decrease to about 120° F. and holding at this temperature while the blend was completed. Vigorous mechanical agitation was maintained throughout.

Blend D was prepared by employing the same procedure described for Blend B above.

Blend E was prepared by employing a petrolatum wax having an A. S. T. M. melting point of approximately 160° to 180° F. and melting it at the lowest practicable temperature, that is, slightly above its melting point. Heating was continued with vigorous agitation and then the thus semi-liquid wax was thoroughly mixed with the other ingredients in the table at approximately the same temperature, that is 160° F. and up to not higher than 180° F. With continued agitation, the resultant blend was allowed to cool to about 75° F. (room temperature).

Another composition, Blend F, was prepared by a process illustrative of this invention, as follows: Twenty-three parts by weight of a petrolatum wax having approximately 115 to 135 penetration was heated to not more than about 160° F. (That is, not more than about 10° F. above the A. S. T. M. melting point of the wax, which was about 153° F.) The thus-melted wax was vigorously agitated mechanically and allowed to cool to not more than about 18° F. below the specified melting point, which is down to about 135° F. At this latter temperature, there was blended into the petrolatum wax an amount of hydrocarbon solvent, in this case 55 parts of mineral spirits mixed with about 20 parts of a neutral medium viscosity low V. I. (viscosity index) lubricating oil, in an amount sufficient to dissolve out the oil in the petrolatum wax but insufficient to dissolve more than a small fraction at most of the suspended solid wax particles. If desired, the lubricating oil can be mixed with the wax first, heated to not higher than about 160° F., then cooled to the lower specified temperature (135° F.) and the mineral spirits solvent then gradually blended in beginning at this lower temperature and continued at a somewhat declining temperature due to the addition of the cold solvent. If the temperature falls much below 120° F. due to this addition, the final blend should be brought up to at least about 120° F. and not higher than approximately 135° F. and then held in this temperature range until complete uniform mixing is obtained. Vigorous mechanical agitation of the melted wax and its blends was employed throughout.

Blends B, C, D, E and F, made according to the above-described procedures illustrative of this invention, remained stable during storage at room temperature for several months. On the other hand, comparative blends which were made in the same manner except to heat and/or cool beyond the limits specified for this invention, were found to be unstable and to result in a settling out of the suspended wax particles.

As an example of storage stabilities of suspensions of wax particles in the mineral spirits and lubricating oil carrier, the following data are illustrative:

| | Viscosities at 100° F. (c. s.), After Storage | | |
|---|---|---|---|
| | 0 days | 14 days | |
| Sample | | | |
| Blend F | 7.6 | 8.4 | No sediment. |
| Blend R [1] (Comparative Control). | 6.5 | 5.2 | Heavy sediment. |

[1] Blend R was heated up to about 200° F. during the blending process.

Blend C and other blends of this invention also remained stable after subjecting to 24-hour periods of temperature extremes of −20° F. and 130° F. Blend C was coated upon clean steel panels which were then exposed to outdoor weathering corrosive conditions for 65 days. At the end of this time the steel was found to be free of rust. On the other hand, compositions containing the same constituents and the oleate additive, but not prepared according to this invention, were found to allow considerable rusting to occur under the same conditions.

EXAMPLE III

The effect of final blending temperature with an inert liquid organic diluent in the case of the present compositions is demonstrated in the following illustrative examples. A series of blends containing 30% wt. of a short residue petrolatum with an A. S. T. M. melting point of about 150° F., 17 wt. percent of lead naphthenate and 53% of an aromatic petroleum extract (B. P. about 300° F. to 390° F.) were all compounded in the same manner except for the final blending temperature of the solvent-solid mixture. The prepared blends were then coated upon steel panels in the same manner and the resultant coatings or films were tested for film thickness, appearance of film, fluidity of blend, and protection of the thus-coated steel from rusting when subjected to a water spray containing 4% salt. All of these blends were prepared as follows: the petrolatum was liquefied and incorporated with the lead naphthenate at about 180° F., and the resultant mixture was held at this temperature under vigorous agitation sufficient to obtain uniform blending (about 15 minutes). The mixture was then cooled with agitation to 135° F. at which point the aromatic solvent was added slowly with agitation. The solvent-solid mixture was then reheated to the desired final blending temperature (which should be at least substantially below 150° F. in accordance with this invention), held there for sufficient time to allow equilibrium to be reached (about 15 minutes) and then allowed to cool to room temperature with continuous agitation. The results from the above-described tests with these blends are summarized in the following table:

*Effect of final blending temperature upon physical characteristics of a petrolatum blend*

| Final Blending Temperature | 110° F | 130° F | 150° F | 180° F |
|---|---|---|---|---|
| Film Thickness in inches | 0.0055 | 0.0037 | 0.0006 | 0.0005 |
| Appearance of Coating | Smooth[1] | Smooth[1] | Grainy | Grainy |
| Fluidity at 40° F | Solid | Solid | Fluid | Fluid |
| Protection of Coated Steel From Rusting Caused By a 4% Salt in Water Spray | 650 hrs | 580 hrs | 240 hrs | 120 hrs |

[1] No grains of wax present.

We claim as our invention:

1. A process for preparing a protective coating composition comprising: heating a residual petrolatum wax containing a minor amount of petroleum oils, said wax having an A. S. T. M. melting point of between about 130° F. and about 160° F., to a temperature between about 5° F. and about 20° F. above said melting point, vigorously agitating the resultant semi-liquid, at this temperature for a period of time sufficient to obtain finely dispersed solid wax particles in a liquid phase, continuing the agitation while allowing the resultant semi-liquid material to cool to a temperature between about 5° F. and about 30° F. below said melting point sufficiently to partially solidify the liquefied phase into a substantially increased number of finely dispersed solid wax particles in a remaining liquid phase, and blending therewith within said lower temperature limits and with agitation a mineral spirits petroleum distillate having a boiling point range between about 300° F. and about 400° F.

2. A process for preparing a protective coating composition comprising: heating a residual petrolatum wax containing a minor amount of petroleum oils, said wax having an A. S. T. M. melting point of between about 130° F. and about 160° F., to a temperature between about 5° F. and about 20° F. above said melting point, vigorously agitating the resultant semi-liquid, at this temperature for a period of time sufficient to obtain finely dispersed solid wax particles in a liquid phase, continuing the agitation while allowing the resultant semi-liquid material to cool to a temperature between about 5° F. and about 30° F. below said melting point sufficient to partially solidify the liquefied phase into a substantially increased number of finely dispersed solid wax particles in a remaining liquid phase, and blending therewith within said lower temperature limits and with agitation, an inert liquid hydrocarbon diluent.

3. A process for preparing a protective coating composition comprising: heating a predominantly hydrocarbon wax material to a temperature at about the average melting point of said wax material for a period of time sufficient to convert said material to a free-flowing semi-liquid material containing at least a substantial proportion of liquefied wax having finely dispersed solid wax particles therein, vigorously agitating said semi-liquid material, cooling it to a lower temperature sufficient to solidify a substantial proportion of the liquefied wax into an increased number of finely dispersed solid wax particles in a continuous liquid phase, blending therewith an inert liquid organic diluent, retaining substantially all of the solidified wax in a finely dispersed storage-stable form, and further blending in at the lower cooled temperature a pre-prepared blend of an inert liquid organic diluent and an oxidized asphalt having a penetration of at least about 30 at 77° F. in an amount insufficient to change the smooth non-grainy depositing property of said storage-stable dispersion of wax.

4. A process for preparing a protective coating composition comprising: heating a mixture of a predominant amount of hydrocarbon waxes containing a minor amount of petroleum oils normally associated therewith, to a temperature above and yet not higher than about 30° F. above the A. S. T. M. melting point of said mixture, vigorously agitating the resultant semi-liquid material at this temperature for a period of time sufficient to obtain finely dispersed solid wax particles from said mixture suspended in a liquid phase therefrom, continuing the agitation while allowing the semi-liquid to cool to a temperature between slightly below and not more than about 40° F. below said melting point to effect partial solidification of the liquefied phase, maintaining at this lower temperature a semi-liquid condition but modified in having a substantially increased number of finely dispersed solid wax particles, and blending therewith within said lower temperature limits and with mechanical agitation, an inert liquid organic diluent.

5. A process for preparing a protective coating composition comprising: heating a predominantly wax material above and yet not higher than about 30° F. above the A. S. T. M. melting point of said material, vigorously agitating the resultant semi-liquid at this temperature for a period of time sufficient to obtain finely dispersed solid wax particles from said material suspended in a liquid phase therefrom, continuing the agitation while allowing the resultant semi-liquid material to cool to a temperature between slightly below and not more than about 40° F. below said melting point to effect partial solidification of the liquefied phase, maintaining at this lower temperature a semi-liquid condition but modified in having a substantially increased number of finely dispersed solid wax particles, and blending therewith within said lower temperature limits and with mechanical agitation, an inert liquid organic diluent.

6. A process for preparing a protective coating composition comprising: heating a residual petrolatum wax containing a minor amount of petroleum oils, said wax having an A. S. T. M. melting point of between about 110° F. and about 180° F., to a temperature at about said melting point for a period of time sufficient to convert said material to a free-flowing semi-liquid composed of a liquid phase containing a substantial proportion of liquefied wax and solid wax particles dispersed therein, vigorously agitating the semi-liquid while cooling it to a lower temperature sufficient to solidify a substantial proportion of the liquefied wax into finely dispersed solid wax particles, and blending therewith at said lower temperature a petroleum lubricating oil under vigorous agitation, thereby producing a composition in which substantially all of the solidified wax is retained in a finely dispersed storage-stable form.

7. A process for preparing a protective coating composition comprising: heating a residual petrolatum wax material containing a minor amount of petroleum oils normally associated therewith to a temperature at about the average melting point of the waxes contained therein for a period of time sufficient to convert said material to a free-flowing semi-liquid composed of a liquid phase containing a substantial proportion of liquefied wax and solid wax particles dispersed therein, vigorously agitating the semi-liquid while cooling it to a lower temperature sufficient to solidify a substantial proportion of the liquefied wax into finely dispersed solid wax particles, and blending therewith at said lower temperature an inert liquid hydrocarbon diluent under vigorous agitation, thereby producing a composition in which substantially all of the solidified wax is retained in a finely dispersed storage-stable form.

8. A process for preparing a protective coating composition comprising: heating a mixture of a predominant amount of hydrocarbon waxes containing a minor amount of petroleum oils normally associated therewith to a temperature at about the average melting point of said waxes for a period of time sufficient to convert said mixture to a free-flowing semi-liquid composed of a liquid phase containing a substantial proportion of liquefied wax and solid wax particles dispersed therein, vigorously agitating the semi-liquid while cooling it to a lower temperature sufficient to solidify a substantial proportion of the liquefied wax into finely dispersed solid wax particles, and blending therewith at said lower temperature an inert liquid hydrocarbon diluent under vigorous agitation, thereby producing a composition in which substantially all of the solidified wax is retained in a finely dispersed storage-stable form.

9. A process for preparing a protective coating composition comprising: heating a predominantly hydrocarbon wax material to a temperature at about the average melting point of the waxes contained therein for a period of time sufficient to convert said material to a free-flowing semi-liquid composed of a liquid phase containing a substantial proportion of liquefied wax and solid wax particles dispersed therein, vigorously agitating the semi-liquid while cooling it to a lower temperature sufficient to solidify a substantial proportion of the liquefied wax into finely dispersed solid wax particles, and blending therewith at said lower temperature an inert liquid hydrocarbon diluent under vigorous agitation, thereby producing a composition in which substantially all of the solidified wax is retained in a finely dispersed storage-stable form.

10. A process for preparing a protective coating composition comprising: heating a predominantly wax material to a temperature at about the average melting point of the waxes contained therein for a period of time sufficient to convert said material to a free-flowing semi-liquid composed of a liquid phase containing some liquefied wax and solid wax particles dispersed therein, vigorously agitating the semi-liquid while solidifying a substantial proportion of the liquefied wax into finely dispersed solid wax particles, and blending therewith an inert liquid organic diluent, thereby producing a composition in which substantially all of the solidified wax is retained in a finely dispersed storage-stable form.

11. A semi-liquid storage-stable product which is suitable for depositing a smooth substantially non-porous protective coating on a metal, said product consisting essentially of a stable dispersion of finely divided hydrocarbon wax particles in an inert diluent produced by heating a predominantly hydrocarbon wax material to a temperature at about the average melting point of the waxes contained therein for a period of time sufficient to convert said material to a free-flowing semi-liquid material composed of a liquid phase containing a substantial proportion of liquefied wax and solid wax particles dispersed therein, vigorously agitating the semi-liquid material while cooling it to a lower temperature sufficient to solidify a substantial proportion of the liquefied wax into finely dispersed solid wax particles, and blending therewith at said lower temperature under vigorous agitation an inert liquid hydrocarbon diluent.

12. A semi-liquid storage-stable product which is suitable for depositing a non-porous protective coating on a metal, consisting essentially of a stable-dispersion of finely divided wax particles in an inert organic diluent prepared by heating a predominantly solid wax material to a temperature at about the average melting point of the waxes contained therein for a period of time sufficient to convert said material to a free-flowing semi-liquid material composed of a liquid phase containing a substantial proportion of liquefied wax and solid wax particles dispersed therein, vigorously agitating the semi-liquid material while cooling it to a lower temperature sufficient to solidify a substantial proportion of the liquefied wax into finely dispersed solid wax particles, and blending therewith under vigorous agitation and at said lower temperature an inert liquid organic diluent.

13. A process for preparing a protective coating composition which comprises heating 30 parts by weight of a short residue petrolatum having an A. S. T. M. melting point of about 150° F. to about 180° F. and incorporating therewith at about 180° F. 17 parts by weight of lead naphthenate, agitating the resulting mixture at this temperature for a sufficient period of time to obtain a uniform blend, continuing the agitation while permitting the mixture to cool to 135° F., adding with agitation at this temperature 53 parts by weight of an aromatic petroleum extract having a boiling point of from about 300° F. to about 390° F., heating the mixture at a temperature of 110° F. and then permitting the mixture to cool to room temperature with continuous agitation.

14. A process for preparing a protective coating composition containing from 48% to 87% by weight of a short residue petrolatum wax, 10% to 46% by weight of a neutral lubricating oil having a low viscosity index and from 1% to 6% by weight of glycerol monooleate which comprises: heating said wax with agitation to a temperature of not higher than 20° F. above the A. S. T. M. melting point for a period of time sufficient to obtain finely dispersed solid wax particles in a liquid phase, cooling said mixture under agitation to a temperature not more than 40° F. below said A. S. T. M. melting point to form additional finely dispersed solid wax particles in a liquid phase, blending with said mixture under agitation said lubricating oil and said glycerol monooleate and maintaining the resulting blend at a temperature of 145° F. with agitation for a period of time sufficient to give a uniform blend, and thereafter allowing said blend to cool to room temperature.

15. A process for preparing a protective coating composition, comprising: heating about 24 parts by weight of a residual petrolatum wax having an A. S. T. M. melting point of about 150° F. to a temperature not higher than 20° F. above said A. S. T. M. melting point for a period of time sufficient to obtain finely dispersed solid wax particles in a liquid phase; agitating and cooling the resulting admixture to a temperature not more than 30° F. below said A. S. T. M. melting point to form additional finely dispersed solid wax particles and adding thereto with agitation about 23 parts by weight of a low viscosity index lubricating oil, about 50 parts by weight mineral spirits and about 3 parts by weight glycerol monooleate to form a uniform blend and at the same time maintaining the temperature of the blend not more than 30° F. below said A. S. T. M. melting point, the sum of the parts by weight of the above materials amounting to 100% by weight of the total composition.

16. A process for preparing a protective coating composition comprising: heating about 24 parts by weight of a predominantly hydrocarbon wax material to a temperature at about the average melting point of said wax material for a period of time sufficient to convert said wax material to a free-flowing semi-liquid containing at least a substantial proportion of liquefied wax having finely dispersed solid wax particles therein; agitating and cooling the resulting admixture to a lower temperature sufficient to solidify a substantial proportion of the liquefied wax into an increased number of finely dispersed solid wax particles and adding thereto with agitation about 23 parts by weight of a low viscosity index lubricating oil, about 50 parts by weight mineral spirits and about 3 parts by weight glycerol monooleate to form a uniform blend, at the same time maintaining the temperature of the blend not more than 40° F. below said average melting point, the sum of the parts by weight of the above materials amounting to 100% by weight of the total composition.

17. A process for preparing a protective coating composition, which process comprises: heating a predominantly hydrocarbon wax material to a temperature at about the average melting point of said wax material for a period of time sufficient to convert said wax material to a free-flowing semi-liquid containing at least a substantial proportion of liquefied wax having finely dispersed solid wax particles therein; agitating and cooling the resulting admixture to a lower temperature sufficient to solidify a substantial proportion of the liquefied wax into an increased number of finely dispersed solid wax particles and adding thereto with agitation a liquid hydrocarbon diluent and between about 1% and 6% by weight of the total composition of glycerol mono-oleate to form a uniform blend, at the same time maintaining the temperature of the blend not more than 40° F. below said average melting point.

KNAPEL F. SCHIERMEIER.
WALTER E. HEINZ.

REFERENCES CITED

The following references are of record in the file of this patent:

UNITED STATES PATENTS

| Number | Name | Date |
|---|---|---|
| 4,397 | Lambe | May 23, 1871 |
| 1,685,008 | Souther | Sept. 18, 1928 |
| 1,685,068 | Souther | Sept. 18, 1928 |
| 2,015,739 | Winning | Oct. 1, 1935 |
| 2,136,282 | Dickinson | Nov. 8, 1938 |
| 2,229,658 | Jenkins | Jan. 28, 1941 |
| 2,306,201 | Wiles | Dec. 22, 1942 |